(12) United States Patent
Brodetsky

(10) Patent No.: US 9,458,837 B2
(45) Date of Patent: Oct. 4, 2016

(54) THERMALLY DRIVEN SOLAR POWER GENERATING SYSTEM

(71) Applicant: PETERBROD CORP., Los Angeles, CA (US)

(72) Inventor: Peter Brodetsky, Encino, CA (US)

(73) Assignee: PeterBrod Corp., Los Angeles, CA (US)

( * ) Notice: Subject to any disclaimer, the term of this patent is extended or adjusted under 35 U.S.C. 154(b) by 0 days.

(21) Appl. No.: 14/363,071

(22) PCT Filed: Dec. 25, 2013

(86) PCT No.: PCT/US2013/077729
§ 371 (c)(1),
(2) Date: Jun. 5, 2014

(87) PCT Pub. No.: WO2014/193476
PCT Pub. Date: Dec. 4, 2014

(65) Prior Publication Data
US 2016/0069329 A1 Mar. 10, 2016

Related U.S. Application Data

(60) Provisional application No. 61/827,835, filed on May 28, 2013, provisional application No. 61/906,605, filed on Nov. 20, 2013.

(51) Int. Cl.
| | |
|---|---|
| F03G 6/04 | (2006.01) |
| F02C 6/18 | (2006.01) |
| F25B 27/02 | (2006.01) |
| F02C 1/05 | (2006.01) |
| F02C 6/06 | (2006.01) |
| F02C 7/08 | (2006.01) |
| F01K 21/04 | (2006.01) |
| F02C 1/00 | (2006.01) |
| F02C 3/04 | (2006.01) |

(52) U.S. Cl.
CPC .............. *F03G 6/04* (2013.01); *F01K 21/04* (2013.01); *F02C 1/00* (2013.01); *F02C 1/05* (2013.01);

(Continued)

(58) Field of Classification Search
CPC ........... F03G 6/02; F03G 6/04; F03G 6/064; F02C 1/05; F02C 3/04; F02C 3/305; F02C 6/06; F02C 6/10; F02C 7/10; Y02E 10/44; F28D 21/0001; F28D 21/0003; F28D 21/0008; F28D 21/001; F28D 21/0012; F25B 27/00–27/02
USPC ........... 60/39.5, 39.511, 39.53, 39.59, 39.83, 60/682, 690, 692, 693, 641.13, 641.14; 165/110–115
See application file for complete search history.

(56) References Cited

U.S. PATENT DOCUMENTS

| | | | | |
|---|---|---|---|---|
| 4,189,922 A | * | 2/1980 | Bellofatto | ................. F02C 1/05 60/641.8 |
| 4,751,814 A | * | 6/1988 | Farrell | ..................... F02C 1/04 60/39.183 |

(Continued)

*Primary Examiner* — Thomas Denion
*Assistant Examiner* — Laert Dounis
(74) *Attorney, Agent, or Firm* — Aleksandr Smushkovich

(57) ABSTRACT

A proposed thermally driven solar power generating system includes a solar air heater receiving an airflow, a gas turbine driving a generator and at least one exhaust compressor, a humidifying air recuperator communicating with the heater. The recuperator includes a water pipeline, product channels, dry working channels, wet working channels connected with the dry channels, having pair-wise heat transfer relations. The airflow passes via the dry and wet channels, a portion thereof moves and expands through the turbine converting into a product stream, drawn into the product channels, cooled and condensed there. Condensate water moves from the product channels and pipeline into the wet channels. The product stream is sucked by the compressor and converted into a product air stream discharged therefrom. In embodiments, it incorporates an air cooler, auxiliary burner chamber, heat accumulator, solar desorber, additional cooler or M-Cooler, heat exchangers communicating with a number of the exhaust compressors.

4 Claims, 9 Drawing Sheets

(52) U.S. Cl.
CPC . *F02C 3/04* (2013.01); *F02C 6/06* (2013.01); *F02C 6/18* (2013.01); *F02C 7/08* (2013.01); *Y02E 10/46* (2013.01)

(56) References Cited

U.S. PATENT DOCUMENTS

| | | | | |
|---|---|---|---|---|
| 6,318,066 B1* | 11/2001 | Skowronski | .......... | F01K 21/047 165/166 |
| 6,497,107 B2* | 12/2002 | Maisotsenko | ............. | F28D 5/02 62/121 |
| 6,948,558 B2* | 9/2005 | Maisotsenko | ......... | F01K 21/047 165/110 |
| 7,007,453 B2* | 3/2006 | Maisotsenko | ......... | F01K 21/047 415/178 |
| 2004/0103637 A1* | 6/2004 | Maisotsenko | ......... | F01K 21/047 60/39.59 |
| 2005/0056029 A1* | 3/2005 | Maisotsenko | ......... | F01K 21/047 62/121 |
| 2009/0261592 A1* | 10/2009 | Kay | ........................ | F03G 6/064 290/52 |
| 2011/0259007 A1* | 10/2011 | Aoyama | .................... | F02C 1/05 60/641.14 |

* cited by examiner

THERMALLY DRIVEN SOLAR POWER GENERATING SYSTEM

CROSS-REFERENCE TO RELATED APPLICATIONS

This application is a U.S. national stage application of a PCT application PCT/US2013/077729 filed on 25 Dec. 2013, whose disclosure is incorporated herein in its entirety by reference, which PCT application claims priority of U.S. patent applications Nos. 61/827,835 filed on 28 May 2013 and 61/906,605 filed on 20 Nov. 2013.

FIELD OF THE INVENTION

The proposed invention relates to the field of solar thermally driven systems usable for generating power.

BACKGROUND OF THE INVENTION

Renewable resource as solar energy is critical to the future of our planet. Solar energy and the psychrometric energy (energy from air) obtained through an efficient heat recovery process known as Maisotsenko Cycle (herein further referred to as 'M-Cycle', e.g., see: Clean Air, Vol. 9, pp. 1-18, 2008 Copyright_2008 by Begell House, Inc.) can operate in synergy with each other and, together, they could provide an efficient solution for power generation, using 100% renewable energy. An advanced solar thermally driven power system proposed herein is a new alternative or non-conventional green technology for efficient producing power, which uses solar energy and air as a resource of renewable energy through the unique evaporative cooling process.

Today's market strongly needs to have a simple and cheap system for producing power (electricity), especially for residential applications, using renewable energy as solar heat and air.

The proposed solar thermally driven power system can help solving this problem by employing on the aforementioned processes for heat transfer (also solar heat) for generating mechanical or electrical energy with a maximal thermal efficiency.

Recent developments in the solar energy industry have included proposals for utilizing solar energy for driving rotational equipment such as turbines. In this regard, turbine-driven generators are quite attractive for use in the conversion of solar thermal energy through the proposed invention because of a relatively high efficiency of turbomachinery rotating groups, and because of a relatively long operating life of such equipment.

These proposed solar systems can use air to drive microturbines with modular, mass-produced components with minimal on-site deployment costs and few environmental impacts. It will be of great advantage to commercialize the proposed solar power systems at the market, particularly, since they can be installed practically in any accessible place and they don't require electricity and water. They can be useful for household and industrial applications. They have a high thermal efficiency (about 75%) with low capital investment, exploiting solar energy and air as power sources. The proposed advanced solar thermally driven power system can also be used to retrofit existing power systems for reducing the consumption of fossil fuel, and by conventional combustion power systems using solar thermal energy.

This invention relates to systems and methods for production of electrical or mechanical power by exploiting solar energy as a power source. The inventive solar system has a high effective capacity with low capital investment.

More specifically, this invention relates to solar atmospheric pressure turbine systems as power generating systems in an open loop layout, having a turbine driven by solar-heated air, and which is connected to an electric load, for example, for driving an electric generator.

Also, the inventive solar thermally driven power system comprises a unique humidifying air recuperator, which recovers a sensible and latent heat from a hot airflow discharged from a turbine, cooling and dehumidifying this air before introducing thereof into an exhaust compressor. Simultaneously this recuperator heats up and humidifies airflow before introducing thereof into the turbine using the M-Cycle.

The inventive system includes a solar heater which is exposed directly to solar radiation, which heater is supplied with airflow and provides a means for direct solar heating of the airflow, which airflow is then drawn into an expansion machine through the aforementioned humidifying air recuperator by the exhaust compressor.

The proposed advanced solar thermally driven power system may be active at periods of time wherein incoming solar radiation is insufficient to heat up the air therein to a desired temperature, for example during an early morning, evening, and night time.

The inventive system also can be used for modification of conventional combustion power systems for reducing the consumption of fossil fuel, as well as for modification of conventional solar radiation power systems.

Compared to the traditionally utilized forms of depleteable fuels (coal, oil, nuclear), solar energy represents a clean renewable form of energy. Various solar systems have been designed to capture the solar energy and use it in different applications.

For instance, there are known devices for directly converting solar energy into electricity such as solar photovoltaic panels, which convert incident solar energy into electricity to provide energy solutions with zero pollution or greenhouse gas emissions.

There are thousands of patents for this subject. Some of them are: U.S. Pat. Nos. 3,449,874; 4,245,895; 4,269,173; 4,574,535; 5,125,608; 5,961,099; 6,563,040; 2005/0109384; 2006/0124168; 2008/0066801; 2009/0038672; 2010/0095609; 2011/0277809; 2012/0216855; 8,429,861.

The solar photovoltaic panel, however, suffers two major disadvantages. First, the electrical energy output per area of a photovoltaic panel is very low so that a large number of relatively expensive solar photovoltaic panels must be utilized in order to generate an economically viable quantity of electricity. Conventional solar photovoltaic systems for producing electricity traditionally have an efficiency rate of only 12%-15%, the most efficient ones of 25-35%, i.e. they are expensive and not efficient. Therefore, using the proposed advanced solar thermally driven power system of the present invention, it is possible to increase thermal efficiency more than 2 times for producing power.

Also, the solar photovoltaic panels have a second disadvantage in that they do not provide power when there is little or no available solar energy, hence they may satisfactorily operate in cooperation with a utility grid to avoid power interruptions of energy consumers.

The proposed advanced solar thermally driven power system can provide power anytime when either solar radiation and/or fuel is available, and thusly can operate independent of a utility grid. While emissions are not zero, the system is clean and significantly reduces greenhouse gas emissions compared with traditional energy generating systems.

There are known solar systems for heating up water by solar energy. For example, U.S. Pat. No. 8,353,286 teaches such "Solar water heater and method".

The heated water can be used directly for heating or it can be used to power a turbine which in turn rotates a generator to produce electricity. A disadvantage of solar-heated water turbine systems is that such systems are very expensive to produce. Furthermore, water turbine systems are closed systems which present another disadvantage that can be clearer understood as discussed below in contrast with the present invention.

Traditional solar power systems usually include photovoltaic panels that generate electricity directly from sunlight. On the other hand, conventional heating-based power systems and machinery typically use Brayton or Rankine cycles. The latter are currently competitive with the photovoltaic panels on a cost per kilowatt basis.

Recent developments in the solar energy industry have included proposals for utilizing solar energy for driving rotational equipment such as turbines or the like. In this regard, turbine-driven generators are quite attractive for use in the conversion of solar energy because of a relatively high efficiency of turbo-machinery rotating groups, and because of a relatively long operating life of such equipment.

For example, US Patent Application 20110283700 "SOLAR COMBINED CYCLE POWER SYSTEMS" teaches that such solar system comprises a concentrating dish and a solar receiver to utilize concentrated solar radiation for heating a first working fluid, and a first turbine configured for generating electricity based on the Brayton cycle. This solar system comprises at least one recovery power plant including a heat recovery unit configured for utilizing exhaust heat of the first turbine to heat a second working fluid, and a second turbine configured for generating electricity by the Rankine cycle. However, this known solar system has a low thermal efficiency, which is 22% at the highest. Also, this system is complicated and expensive, using a combined cycle. It comprises a lot of elements to implement the Brayton cycle (as a topping cycle) and simultaneously Rankine cycle (as a bottoming cycle).

Efficiency is extremely important in solar power systems as a means to reduce size and space, and ultimately drive down installation costs. This is a reason why today solar thermal systems almost aren't used for producing power (electricity).

The Japan Society of Mechanical Engineers published a paper: "Study on Utilization of Solar Thermal Energy by Inverted Brayton Cycle" by KANEKO, Ken-ichi and et al. (see Proceedings of thermal engineering conference, 2001, 297-298, 20011103).

This paper presents a study of the performance of a solar thermal power generation system that has been working on the atmospheric pressure. The Heat Transfer Salt (HTS) was used as heat storage material heated by focusing solar energy through a convex lens. It was shown that if a high temperature HTS of more than 300 degree centigrade was developed, this solar thermal power generation system was characterized with only 30% of thermal efficiency.

The solar absorber typically comprised a device for transferring the concentrated solar radiation energy to a high temperature/high pressure working fluid by means of a relatively complex heat exchanger. The high pressure working fluid in turn was expanded through a high pressure turbine for conversion to rotational energy for driving electrical generators or the like (see, for example, U.S. Pat. No. 4,033,118 of this type of system). However, these systems have not been widely used chiefly because of complexity and expensiveness of the heat exchanger, together with relatively large dimensions of the heat exchanger.

Some solar-powered systems have been proposed, which attempt eliminating the high pressure/high temperature heat exchanger used as a solar absorber. For example, U.S. Pat. No. 3,203,167, discloses an atmospheric pressure solar absorber for transferring heat energy to ambient air which is then injected into a high pressure turbo-compressor cycle by means of a supersonic jet pump. However, the requirement of the jet pump, together with the high pressures and temperatures required for operating the turbo-compressor rotating group, still result in a relatively expensive and complex system which has not been commercially accepted.

The Mackay's U.S. Pat. No. 4,280,327 describes a solar-powered turbine system that comprises a solar air heater, where air is heated generally at atmospheric pressure and the heated air is supplied directly to a rotatable turbine of the subatmospheric turbine system. The heated air generally at atmospheric pressure is expanded and cooled through the turbine to a subatmospheric pressure to convert the solar heat energy into power for rotationally driving the turbine. In turn, the turbine rotationally drives a system compressor, as well as power output means comprising an electrical generator or the like.

However, this solar-powered turbine system isn't efficient. The known system doesn't provide a means for humidifying the air before the turbine in a thermodynamically efficient manner and consequently cannot guarantee a high level of moisture for this air, using heat from the exhaust air stream after the turbine. Air with a higher air humidity ratio and temperature, entering the turbine, creates lower density air, which is better for volumetric turbine efficiency.

SUMMARY OF THE INVENTION

The proposed advanced solar thermally driven power system offers significant advantages with minimum changing, rewarding efficiency and low-cost comparing with existing technologies. Using this solar system through a simple cycle and without the bottoming Rankine Cycle, it is possible to achieve thermal efficiency of more than 70% for solar thermally driven power systems.

The proposed advanced solar thermally driven power system has the ability to harness simultaneously power of the sun and psychrometric energy from air. These kinds of renewable energy can be efficiently and inexpensively implemented for producing power (with thermal efficiency about 75%) and simultaneously greatly reducing pollution.

Traditional solar thermal power systems use the traditional technology that has an efficiency rate of 20%-30%. The proposed systems are much more thermally efficient than any existing solar systems for producing power.

In accordance with the invention, the inventive solar thermally driven power system comprises a solar air heater for focusing solar radiation. Air within the solar heater is heated generally at atmospheric pressure by heat absorption and the heated air is supplied through a humidifying air recuperator to a rotatable turbine of an atmospheric pressure turbine system as a power generating device.

The solar heated air generally at atmospheric pressure is expanded and cooled through the turbine to a sub-atmospheric pressure to convert the solar energy into power for rotationally driving the turbine. In turn, the turbine rotationally drives a system compressor, as well as a power output means comprising an electrical generator or the like.

Expanded air is supplied from the turbine at subatmospheric pressure through a humidifying air recuperator for recompression by the exhaust compressor. More specifically, the exhaust compressor recompresses the cooled air to approximately the atmospheric pressure, and it is exhausted to atmosphere.

Also, the present invention provides an improved solar thermally driven power system, which eliminates expensive and complicated heat transfer apparatus, and which is capable of operating at relatively low temperatures and pressures, using cheap and light-weight materials.

The proposed invention implements very efficient heat recovery processes through a humidifying air recuperator, which utilizes a unique evaporative cooling process, employing the M-Cycle, by evaporating water to air. It helps to recover a greater possible amount of heat and water from the exhaust gas after the turbine, which is sucked by the exhaust compressor and compressed to atmospheric pressure and discharged to atmosphere as a product stream with parameters (temperature and humidity), approaching lower parameters of the atmosphere. It minimizes heat losses of the inventive solar thermally driven power system.

As a result, almost all heat, which was brought by solar energy or/and burned fuel for to the inventive solar thermally driven power system, is utilized for producing additional mechanical energy (or electricity).

Herewith finally, after passing through the humidifying air recuperator, it is possible to obtain a working airflow with a significantly high absolute humidity, and accordingly with a significantly high volumetric flow rate, before introducing thereof into the gas turbine. As a result, a thermal efficiency for this solar thermally driven power system is more than 70% (about 75%) in comparison with traditional solar thermally driven power systems that operate with an efficiency of only 20%-30%.

Also, when the proposed solar thermally driven power system is working in a thermal mode, using the solar air heater together with an auxiliary natural gas burner, its combustion process through vast moisten air brings a significant reduction of pollution (about 10 times). As a result, it helps to serve both environmental and energy savings targets (see a paper by Remi Guillet: "The humid combustion to protect environment and to save the fuel: The Water Vapour Pump and Maisotsenko Cycles examples", International Journal of Energy for a Clean Environment, Volume 13, 2012).

The proposed solar thermally driven power system is an advantageous replacement for steam cycles or gas closed loops which are equally based on the solar energy only. It has, in fact, the advantage of a lesser initial cost and does not require the use of a coolant medium when the production of only electric power is demanded.

BRIEF DESCRIPTION OF THE DRAWINGS

The advanced solar thermally driven power system of the present invention will be more clearly understood by reference to the following detailed description, when read in conjunction with accompanying drawing, wherein like reference characters refer to like parts throughout the several views and in which.

DETAILED DESCRIPTION OF PREFERRED EMBODIMENTS OF THE INVENTION

Figure 1:
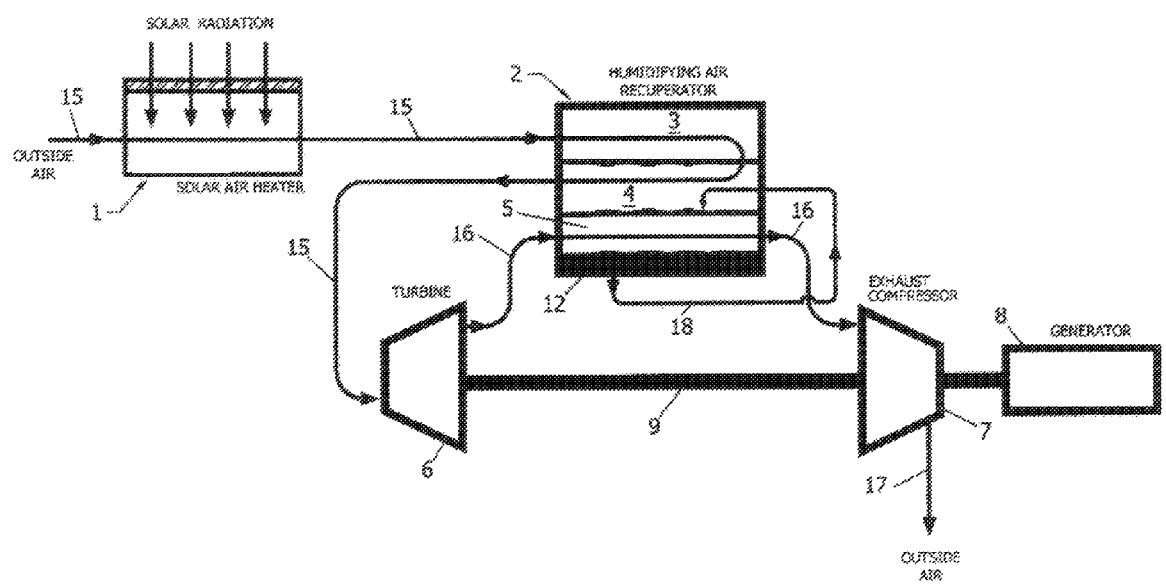
FIG. 1 is a schematic depiction of the proposed advanced solar thermally driven power system.

Below is a table of reference numbers and elements used in the description below.

| Reference Numeral | Element |
|---|---|
| 1 | Solar air heater |
| 2 | Humidifying air recuperator |
| 3 | Dry working channel |
| 4 | Wet working channel |
| 5 | Product channel |
| 6 | Gas turbine |
| 7 | Exhaust compressor |
| 8 | Electrical generator |
| 9 | Shaft |
| 10 | Air cooler |
| 12 | Condensate |
| 14 | Water pump |
| 15 | Airflow (outside or working air) |
| 16 | Product stream after the gas turbine |
| 17 | Product stream after the exhaust compressor |
| 18 | Water line for transport of the condensate from the product channel for wetting the wet working channels of the humidifying air recuperator |
| 19 | Water line for transport condensate from an air cooler for wetting the wet working channels of the humidifying air recuperator |
| 20 | Auxiliary natural gas combustion chamber |
| 21 | Natural gas burner |
| 22 | Natural gas input |
| 23-27 | Valves |
| 28 | Heat accumulator |
| 30 | Solar desorber |
| 31 | Dry channel |
| 32 | Wet channel |
| 34 | Outside air for the solar desorber |
| 35 | Weak absorbent (desiccant) |
| 36 | Strong absorbent (desiccant) |
| 37 | Additional cooler |

| Reference Numeral | Element |
| --- | --- |
| 38 | Condensing channel |
| 39 | Cooling channel |
| 40 | Outside air for additional cooler |
| 41 | Water pipe line |
| 42 | Dry channel of the M-Cooler |
| 43 | Wet channel of the M-Cooler |
| 44 | Product channel of the M-Cooler |
| 45 | Outside air of the M-Cooler |
| 46 | Water pipe line of the M-Cooler |
| 47 | M-Cooler |
| 48 | First heat exchanger |
| 49 | Second heat exchanger |
| 50 | Coolant |

In a preferred embodiment, the proposed solar thermally driven power system comprises a solar air heater 1 as an air-based solar collector panel with a high real efficiency, which outputs a hot air suitable for driving a consecutive flow volumetric gas turbine 6.

The traditional solar air heater has typically comprised a device for transferring the concentrated solar radiation energy to a high temperature/high pressure air as by means of a relatively complex heat exchanger. The high pressure air, in turn, is expanded through a high pressure turbine for conversion to rotational energy for driving electrical generators. However, these systems have not been widely used because of the complexity and expense of the high pressure solar heat exchanger, together with the required relatively large sizes of the heat exchanger.

The proposed advanced solar thermally driven power system comprises improved solar thermally driven power units with a high thermal efficiency, which also eliminate expensive and complicated heat transfer apparatuses, and which are capable of operating at relatively low temperatures and pressures, using inexpensive and light-weight materials.

The solar air heater 1 (shown in FIG. 1) captures heat from the sun by airflow supplied thereinto, and transfers this heat through a humidifying air recuperator 2 to the turbine 6. In general, the solar air heater 1 comprises an interior space, a glazing surface oriented to the sun, a plate which absorbs solar radiation and converts it into heat, and intake and discharge passages for a circulating heat-transfer fluid. The solar air heater is said to be air-based because for this proposed solar power system the heat transfer fluid is air. A system as a whole is said to be active if it utilizes a device for compelling circulation of air, rather than relying on natural convection.

FIG. 1 is a schematic depiction of the proposed solar thermally driven power system. This system comprises a solar air heater 1 and a humidifying air recuperator 2 including: product channels 5; dry working channels 3; wet working channels 4 directly connected to the dry working channels 3, the wet working channels 4 operatively form a water layer therein, the wet working channels 4 are separated from the dry working channels 3 and from the product channels 5 by a respective common heat-conducting wall thereby establishing pair-wise heat transfer relations therebetween; and a water line 18 connecting the bottom of the recuperator 2 with the wet working channels 4.

Also this system comprises in serial: a gas turbine 6, and an exhaust compressor 7 powering an electrical generator 8. The product channels 5 are placed between an outlet of the gas turbine 6 and an inlet of the exhaust compressor 7.

An airflow 15, supplied from the outside, is passed through the solar air heater 1, wherein the airflow 15 increases its temperature, and, thereafter it is directed at first into the dry working channel 3, and next into the wet working channel 4 of the humidifying air recuperator 2. Then the airflow 15 is heated and moisturized therein and further drawn and expanded through the gas turbine 6 to a pressure substantially below the atmospheric pressure. This may be achieved by the use of an exhaust compressor 7 axially coupled to the gas turbine 6 by a shaft 9.

A higher air humidity ratio and temperature of the airflow 15, which is directed to the gas turbine 6, reduces its density that enhances the efficiency of the gas turbine 6.

Thereafter, the airflow 15 from the gas turbine 6, as a product stream 16, is directed for cooling to the product channels 5. Therein, this product stream 16, at a predeterminedly low pressure is cooled below the wet bulb temperature and it approaches the dew point temperature of outside air with reducing its absolute humidity. This low temperature helps condensing vapor of water 12 from the product stream 16.

Consequently, moisture contained in the product stream 16 is condensed and the quantity of the product stream 16 decreases. Thus, a power necessary for driving the exhaust compressor 7 can be reduced. Water 12 extracted from the product stream 16 and drained is recovered. The condensable cold water 12 is directed by a water line 18 from the product channel 5 for wetting the wet working channels 4. Therefore, additional water will not be needed for operating the humidifying air recuperator 2, because it constantly liberates water from the product stream 16. The water line 18 can include a condensate separator for cleaning some polluting condensate components and additional replenishing of water, if it is necessary.

The cooling and dehumidifying processes for the product stream 16 result in a reduction of volume of the product stream 16 inside the product channels 5. This substantially increases the density of the product stream 16 supplied into the exhaust compressor 7, and it increases the efficiency of operating the exhaust compressor 7.

After passing through the product channels 5, the cold and dry product stream 16 is sucked by the exhaust compressor 7, compressed to the atmospheric pressure and discharged into the atmosphere as a product stream 17. This provides effective cooling and dehumidifying processes for the product stream 16, when the product stream 16 passes through the product channels 5.

The exhaust compressor 7 compresses the cold and dry product stream 16 thereby raising its pressure therein to the atmospheric pressure at the outlet of the exhaust compressor 7, where the product air stream 16 is exhausted into the atmosphere.

The process of extraction of heat from the product stream 16, during its passing through the product channels 5, is used to heat and humidify the airflow 15. As described above, the outside air before is preheated by the solar heater 1 and thereafter, as the working airflow 15, is at first passed through the dry working channels 3 and next into the wet working channels 4. Next the heated and moisturized working airstream 15 is directed from the humidifying air recuperator 2 to the gas turbine 6.

During the passing through the wet working channels 4, this working airflow 15 significantly increases its absolute humidity, which is always more than that obtainable from any other known methods of humidifying. The increased humidity raises the volumetric flow rate through the gas turbine 6. A higher volume of working airflow 15 means that there is more air to force through the blades of turbine 6 raising the torque of the turbine, and thereby increasing its power output.

The proposed solar thermally driven power system of FIG. 1 offers a significant improvement (about 75%) in the thermal efficiency of producing power. It is possible to utilize the gas turbine 6 with the exhaust compressor 7, using the humidifying air recuperator 2, as this is shown on FIG. 1. It gives an opportunity to cool (approaching the dew point temperature of outside air) the product air stream 16, which is directed to the exhaust compressor 7, and simultaneously to humidify and heat up the product stream 15 prior to its extension through the gas turbine 6. It also increases their power output and efficiencies. Moreover, both these processes are realized more effectively than traditional evaporative cooling and humidifying processes, and are effected using only one apparatus being the humidifying air recuperator 2 for dew point indirect evaporative cooling.

Since the high-temperature, high-pressure gas flows into the traditional gas turbine; it is difficult to recover power from unused, high-temperature or atmospheric exhaust gases produced by manufacturing processes by the traditional power gas turbine cycle. It is reason why the costs of the heat recovery are intolerably high. Even if heat could be recovered, electric power cannot be recovered.

As stated above, the humidifying air recuperator 2 is used in the proposed solar thermally driven power system, wherein the heating and mass recovery processes are effected at the atmospheric pressure. It significantly improves all characteristics of the humidifying air recuperator 2. These atmospherically supplied humidifying air recuperators are preferred in the residential or commercial setting, being due to their much lower cost, simplicity of design, and ease of maintenance.

It is also noted that most of existing gas turbine power systems typically have material problems, since the materials, they are built from, not only don't satisfactorily withstand high pressures, but also don't withstand high pressures at high temperatures, particularly in stack gases and combustion products, which tend to be corrosive. An effort to overcome these problems usually results in solutions involving considerable expenses, rendering power plants inefficient.

The power system of FIG. 1 operates with lower pressures at lower temperatures, which solves these problems and provides the inventive solar thermally driven power system, incorporating the gas turbine, for being more efficient and inexpensive.

Figure 2:
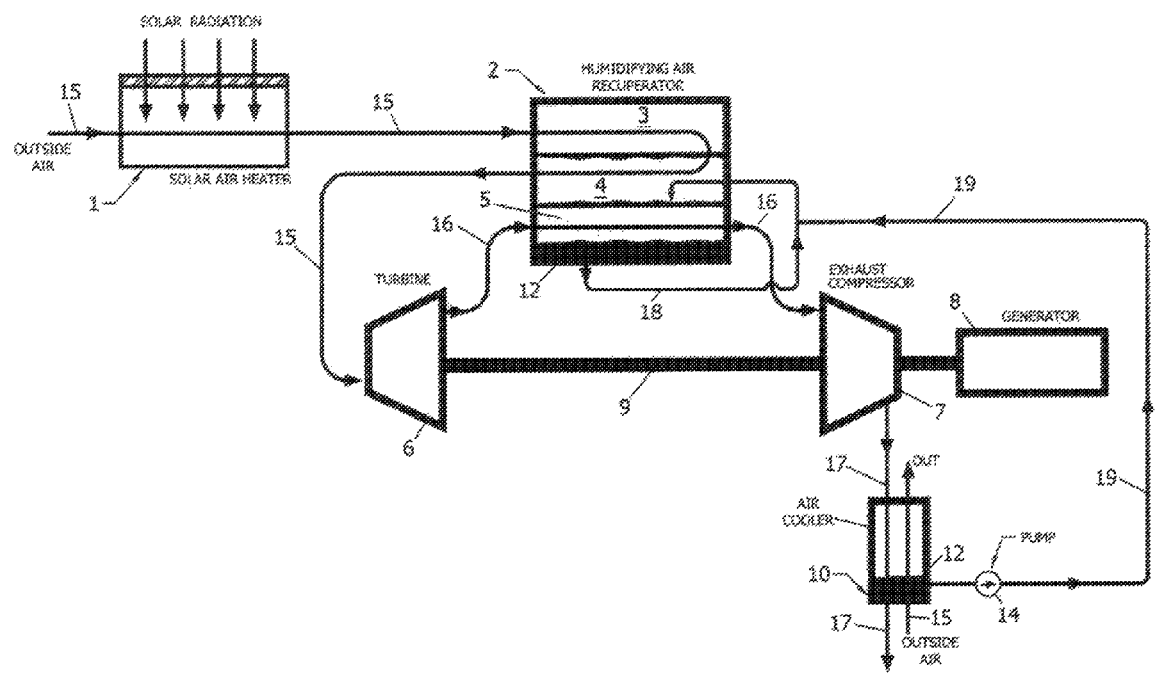
FIG. 2 is a schematic depiction of the proposed advanced solar thermally driven power system like FIG. 1, which contains an air cooler 10.

FIG. 2 illustrates yet another embodiment of the inventive solar thermally driven power system based on a sub-atmospheric expansion of the heated and moist working airflow 15, similar to the one illustrated on FIG. 1, in which an air cooler 10 is used to condensate additional water vapor from the product air stream 17, using a higher pressure (about 1atm) after the exhaust compressor 7.

The exhaust compressor 7 discharges the product stream 16 as the product stream 17 to the air cooler 10. Therein the product stream 17, at the atmospheric pressure, is cooled by outside air thereby reducing its absolute humidity, because an outside temperature is usually less than the dew point temperature of product stream 17. This results in a reduction of the volume of condensation of the product stream 17 inside the air cooler 10. Condensate 12 is directed by a water pump 14 through a water line 19 from the air cooler 10 for wetting of the wet channels 4. After its passing through the air cooler 10, the cold and dehumidified product stream 17 is discharged outside at the atmospheric pressure.

The air cooler 10 offers a significant improvement in thermal efficiency of this system. The heat of the product stream 17, compressed by the exhaust compressor 7, is used for humidifying the product stream 15, reducing its temperature by the evaporative cooling process. This increases the power output of the proposed system.

In a solar thermally driven power system of any type, there are, of course, time periods, during which the solar energy is not sufficiently absorbed to provide the necessary quantity of heat for the particular system. Therefore, an auxiliary heating system is normally provided in combination with the solar heating system. The source of auxiliary heat supply is a major problem. An auxiliary fuel may be available, as in the cases of oil, balloon gas, propane, and the like. In other cases, energy from a commercial utility grid, either pipeline natural gas or electricity, may be available at a uniform price. Preferably, the withdrawal of energy from a gas pipeline may be made at any time a demand exists.

Figure 3:
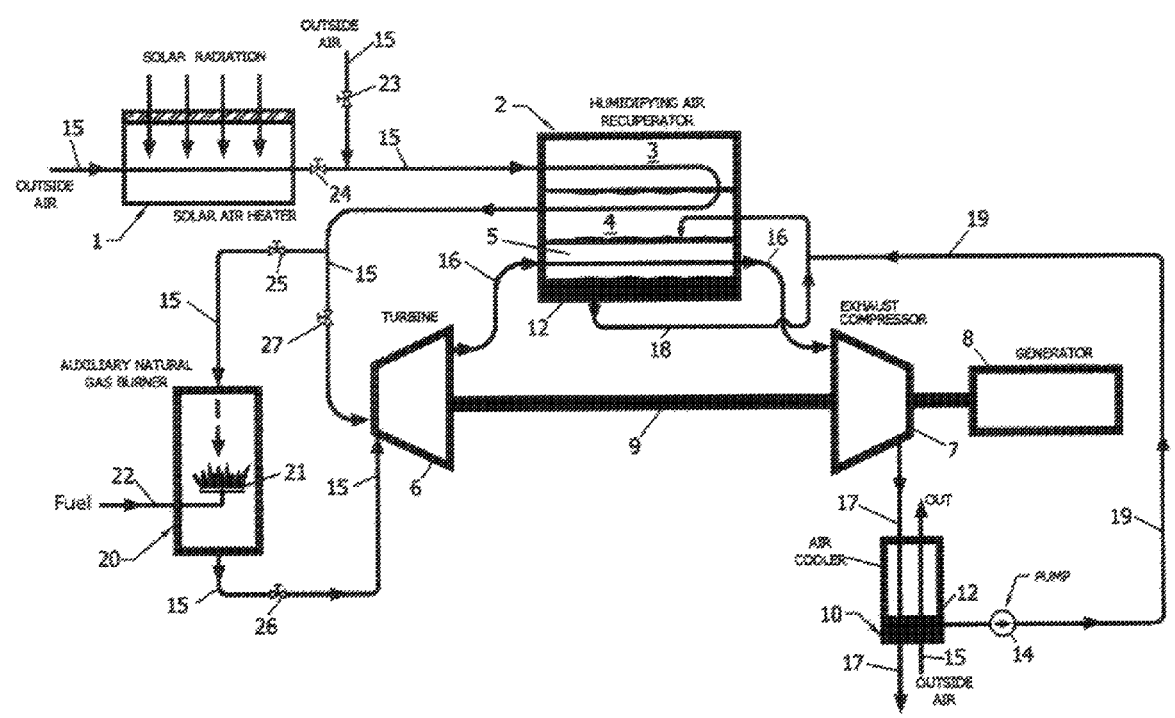
FIG. 3 is a schematic depiction of the proposed advanced solar thermally driven power system, which contain an auxiliary natural gas burner 20.

FIG. 3 is a schematic depiction of the proposed advanced solar thermally driven power system, which comprises an auxiliary natural gas chamber 20 (herein also called 'auxiliary burner chamber 20' that may optionally use another type of fuel).

In a gas turbine engine provided with a turbine, such as a gas turbine, a compressor compresses air at the atmospheric pressure and supplies the compressed air to a burner or combustor, thereafter the combustor mixes the fuel with the compressed air for combustion, which causes the turbine to generate power. Therefore, the pressure of the fuel, such as natural gas, must be higher than that of air at the exit of the compressor. Accordingly, an atmospheric combustion is impossible and heat of the atmospheric exhaust gas cannot be used. Thus, a gas turbine engine provided with a gas turbine has difficulty in using various gaseous fuels, solid fuels and unused high-temperature gases. It is structurally impossible for the gas turbine engine to reduce emission of heat from the system by circulating the exhaust gas like other gas engines do, which is disadvantageous with respect to the thermodynamic cycle.

As mentioned above, in a conventional gas turbine, the pressurized fuel must be supplied to the combustor or burner because the pressure in the combustor is high. It is the reason why the costs of the burner systems are intolerably high.

In the proposed advanced solar thermally driven power system (shown in FIG. 3), an auxiliary natural gas chamber 20 is used, wherein the combustion or burning processes are provided at the atmospheric pressure. It significantly improves all characteristics of the auxiliary natural gas chamber 20. These atmospherically supplied burners are preferred in residential or commercial settings. This is due to their much lower costs, simplicity of design, and ease of maintenance.

The proposed solar thermally driven power system, depicted in FIG. 3, comprises: an auxiliary natural gas chamber 20 including a natural gas burner 21 and a natural gas input 22; a solar air heater 1; and a humidifying air recuperator 2 including product channels 5 and cooperating dry working channels 3 and wet working channels 4. Also this system comprises in serial: a consecutive flow gas turbine 6; and an exhaust compressor 7, powering an electrical generator 8.

An airflow 15 is supplied from the outside into the air heater 1 via a valve 24, as well as via a valve 23 bypassing the air heater 1. In the solar air heater 1, the airflow 15 increases its temperature, and thereafter it is directed at first to the dry working channels 3, and next, to the wet working channels 4. Then the moisturized and heated airflow 15 is divided as follows: a first portion of the airflow 15 is directed to the auxiliary natural gas chamber 20 (via valves 25 and 26), and a second portion the airflow 15 is bypassing the gas chamber 20 (via a valve 27) and is further expanded through the gas turbine 6, but to a pressure substantially below the atmospheric pressure. This may be achieved by the use of the exhaust compressor 7 axially coupled to the gas turbine 6.

Thereafter, the airflow 15 from the gas turbine 6, as a product stream 16, is directed for cooling to the product channels 5. Therein this product air stream 16, at a low pressure, is cooled below the wet bulb temperature and it approaches the dew point temperature of outside air with reducing its absolute humidity.

It helps to condense vapor of water 12 from the product stream 16 inside of the product channels 5. This condensable cold water 12 is directed by a line 18 from the product channel 5 for wetting into the wet working channels 4. This results in a reduction of volume of the product stream 16 inside the product channels 5. This substantially increases the density of the product stream 16 before its sucking by the exhaust compressor 7 and it, relatively, increases the operative efficiency of the exhaust compressor 7. After passing through the product channels 5, the cold and dry product stream 16 is sucked by the exhaust compressor 7, compressed to the atmospheric pressure and discharged through an air cooler 10 to the atmosphere as a product stream 17.

It is important to emphasize that FIG. 3 shows an embodiment of the proposed solar thermally driven power system, which comprises two source of heat: (1) solar air heater 1, and (2) auxiliary natural gas chamber 20. Also, this system comprises the aforementioned valves 23-27. It provides for an opportunity for this power system to selectively work in different thermal modes, using (a) only solar thermal energy, or (b) solar thermal energy together with the auxiliary natural gas chamber 20, or (c) only with the auxiliary natural gas chamber 20.

When the proposed solar thermally driven power system is working in the thermal mode (a), using only the solar thermal energy, the valves 25 and 26 are closed and the valves 24 and 27 are open. In this case the outside airflow 15 is passing through the solar air heater 1, and thereafter is directed at first to the dry working channels 3 and next to the wet working channels 4. Then the moisturized and heated airflow 15 is passed and expanded through the gas turbine 6, but to a pressure substantially below the atmospheric pressure. This may be achieved by the use of the exhaust compressor 7 axially coupled to the gas turbine 6 by a shaft 9. Thereafter the airflow 15 from the gas turbine 6 as the product stream 16 is directed for cooling to the product channels 5. This substantially increases the density of the product stream 16 before its sucking by the exhaust compressor 7. Thereafter the product stream 16 is compressed to the atmospheric pressure and discharged through the air cooler 10 to the atmosphere as the product stream 17.

When the proposed solar thermally driven power system operates in the thermal mode (b), using the solar air heater 1 together with the auxiliary natural gas chamber 20, the valves 24, 25 and 26 are open, and the valve 27 is closed. In this case the outside airflow 15 is passed through the solar air heater 1, and thereafter is directed at first to the dry working channels 3 and next to the wet working channels 4.

Then the high-temperature and humidified airflow 15 is supplied as a combustion working air to the auxiliary natural gas combustion chamber 20, which comprises the natural gas burner 21 and the natural gas input 22. Instead of natural gas, it is possible to use any kind of fuel, for example, coal, bio fuel, wood and etc. Accordingly, for any kind of fuel it is used for a fit design of the combustion chamber. Today, natural gas is the best popular fuel for this reason.

Since the temperature of the high-temperature and humid air 15 is higher, after its passing through the solar air heater 1, the fuel consumption of natural gas input 22 inside of the auxiliary natural gas combustion chamber 20 can be reduced. Since the natural gas input 22 as fuel of the atmospheric pressure is fed into the auxiliary natural gas combustion chamber 20 without increasing the pressure of fuel, the proposed advanced solar thermally driven power system does not need any fuel compressor. After the combustion process, the high-temperature humidified combustion airflow 15 is supplied to the gas turbine 6.

The water content of the high-temperature combustion airflow 15 produced by the auxiliary natural gas combustion chamber 20 is increased by increasing not only by the humidifying air recuperator 2, but also by the water content of the natural gas input 22.

A higher air humidity ratio and temperature of the combustion airflow 15, which enters to the auxiliary natural gas combustion chamber 20, creates a lower density of the combustion airflow 15, which is better for the efficiency of the volumetric gas turbine. The higher temperature combustion airflow 15, entering the combustor, allows for less energy or fuel to be used to obtain the desired combustion temperatures and a greater efficiency.

In addition, and because of the higher efficiency in the advanced solar thermally driven power system, pollution is dramatically (at times) reduced due to the water vapor of the combustion airflow 15 creating a more even burning process inside of the auxiliary natural gas combustion chamber 20 during the combustion. For example, the most toxic pollution from combustion process NO (NOx) issue is reduced by 10.3 times and [CO] concentration is reduced by 1.95 times (see a paper by B. Soroka et al.: "DEVELOPMENT OF CONPUTATION TECHNIQUES AND DATA GENERALIZATION ON BURNING VELOCITY OF DRY AND HUMIDIFIED INFLAMMABLE GAS FUEL-OXIDANT MIXTURES", International Journal of Energy for a Clean Environment, Volume 12, p. 187-208, 2012.

It is important to emphasize, for the proposed solar power systems, the additional water is not needed, because it constantly replenishes water from the exhaust gas after the turbine.

The humidifying air recuperator 2 tends to be the most expensive single component in the proposed solar power systems and micro-turbines that are equipped therewith. The recuperator 2 extracts heat through the M-Cycle (sensible and latent) from the turbine's exhaust airstream 16 into the airflow 15, after its passing through the solar air heater 1, entering the auxiliary natural gas chamber 20 to significantly reduce the fuel consumption and improve the efficiency.

When the proposed advanced solar thermally driven power system operates in the thermal mode (c), using only the auxiliary natural gas chamber 20, the valves 25 and 26 are opened and the valves 24 and 27 are closed. In this case the outside airflow 15 is passed through the valve 23 (the valve 24 is closed), and thereafter is directed at first to the dry working channels 3, and next to the wet working channels 4.

Later than the whole high-temperature and humid airflow 15 is supplied as a combustion working air (the valve 27 is closed) to the auxiliary natural gas combustion chamber 20, which includes the natural gas burner 21 and the natural gas input 22. Since the natural gas input 22 as a fuel is fed into the auxiliary natural gas combustion chamber 20 at the atmospheric pressure without increasing the pressure of the fuel, the proposed advanced solar thermally driven power system does not need any fuel compressor. After the combustion process, the high-temperature humidified combustion airflow 15 is supplied to the gas turbine 6. The process occurs as this was described above.

With the advent of the energy crisis there has been substantial emphasis placed on the utilization of renewable energy sources, such as solar heat. One of the principal problems associated with effective utilization of solar heat has been the cost of storing significant quantities of such heat, that is the cost of a heat accumulator for use during non-daylight hours or during extended periods when the sun was obscured by cloudy or overcast skies. Indeed, the high cost of construction of the existing storage systems has minimized the effective utilization of solar heat.

It is also noted that existing solar heat accumulators, such as solar air heaters of the existing solar turbine power systems, which are used to realize the Brayton or combine cycles, have significant material problems, since the materials do not typically withstand high pressures. Existing solar heat accumulators, such as solar air heaters for transforming the concentrated solar radiation energy to a high pressure air are complex, expensive and excessively sized.

An effort to overcome these problems usually results in solutions involving considerable cost penalties, so that efficient solar power plants remain unavailable to the general public. The proposed advanced solar power system, and its element as the heat accumulator, operates with lower pressures, and resolves these problems and provides a more efficient and inexpensive solar thermally driven power system incorporating the gas turbine.

Figure 4:
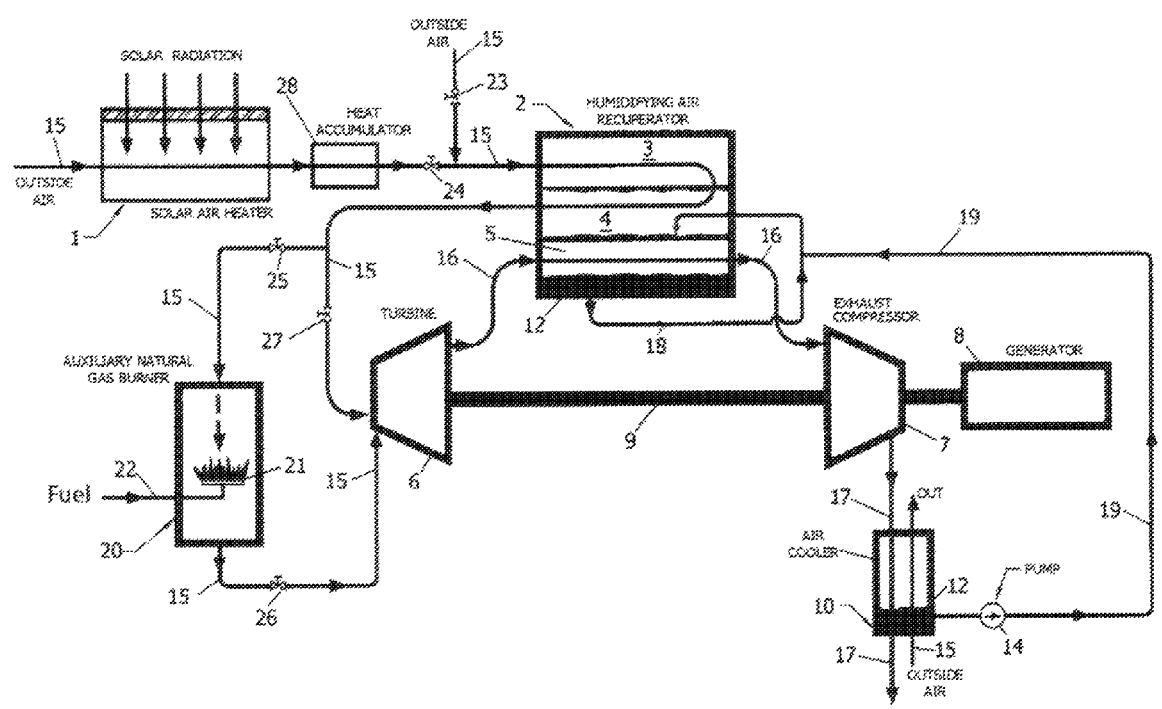
FIG. 4 is a schematic depiction of the proposed advanced solar thermally driven power system like FIG. 3, which contains a heat accumulator 28.

FIG. 4 is a schematic depiction of an embodiment of the proposed advanced solar thermally driven power system shown in FIG. 3, which additionally comprises a heat accumulator 28.

The outside airflow 15 is supplied to the solar air heater 1, wherein the airflow 15 increases its temperature, and thereafter it is directed through a heat accumulator 28 at first to the dry working channels 3, and next to the wet working channels 4 of the humidifying air recuperator 2. The solar air heater 1 through the air-based panels can be used for bringing the heated airflow 15 directly through the humidifying air recuperator 2 to the turbine 6 (see FIG. 3), or in conjunction with the heat accumulator 28 as a storage mechanism, which retains the heat energy for release at a later time (see FIG. 4).

In a system intended to provide a significant portion of a turbine's heating needs on a continuous basis, some form of storage is required. Without a thermal storage, there is typically energy wastage. Furthermore, little energy is retained for release at night or on cloudy days when the solar air heater 1 is not in operation.

It is rational to use the heat accumulator 28, of which it is possible to diminish the temperature drop of the outside airflow 15, by heating the air in the periods of time, in which the solar energy is inadequate, prior to actuating, either partially or at full rate, the auxiliary natural gas chamber 20. As a dry thermal storage, the heat accumulator 28 can made of ceramics.

The proposed advanced solar thermally driven power system is well suited for working in dry climate zones. It is very efficient to use dry outside air as the working airflow 15 for various configurations of the proposed solar power systems described above, which operate employing the dew point indirect evaporative cooling. Sometimes, it is rational to dry the outside air, especially, when this power system is deployed in wet climate zones. In this case, the outside air may be dried with liquid desiccants (such as lithium chloride, bromide, calcium chloride, glycol, triethylene glycol, etc.) or solid desiccants (such as silica gel, molecular sieve, synthetic silicates, zeolites, etc.).

If the product channel 5 and/or the dry working channel 3 are covered by a solid or liquid desiccant, this allows utilizing the cooling process below the dew point temperature of outside air, because it reduces the moisture content of air and thus increases the latent heat potential capacity. As a result, efficiency of the proposed solar power system is increased. Reactivation of the solid or liquid desiccant can take place by the method which is described in the U.S. Pat. No. 6,497,107, or the hot natural gas input 22 can be used for reactivation of solid or liquid desiccants.

The proposed advanced solar thermally driven power system has the ability to harness simultaneously the power of the sun and psychrometric energy from air. However, solar thermal energy can be efficiently used not only for the air heating process, but also for the air dehumidifying process through liquid desiccant.

The liquid desiccant is then regenerated by using the solar thermal energy for dehumidifying, in a cost-effective, low-energy-consumption, continuously repeating cycle. This solar-powered unit doesn't require electrical input or any operating costs. Also, it has no parts that can leak or cause damage.

Reducing the absolute humidity of outside air reduces its dew point temperature as well. When the incoming air is dried there is more moisture that can be evaporated into the air for its saturation and the potential energy of this air is greater.

The air to be cooled can be reduced in temperature ideally to the dew point temperature of the outside air through the aforementioned Maisotsenko Cycle (M-Cycle).

A solar assisted dehumidification process for air is used in the proposed solar thermally driven power system, through a liquid desiccant with far less energy input, which has resulted in significant improvements in the performance, cost, and reliability the proposed solar power system. This system is a powerful green technology that allows for the capture of free solar energy to provide a dehumidification process for air. This system is totally free from greenhouse gas emissions and as such possesses a tremendous potential for both reducing the dependence on fossil fuels and reducing the effects of global warming.

Figure 5:
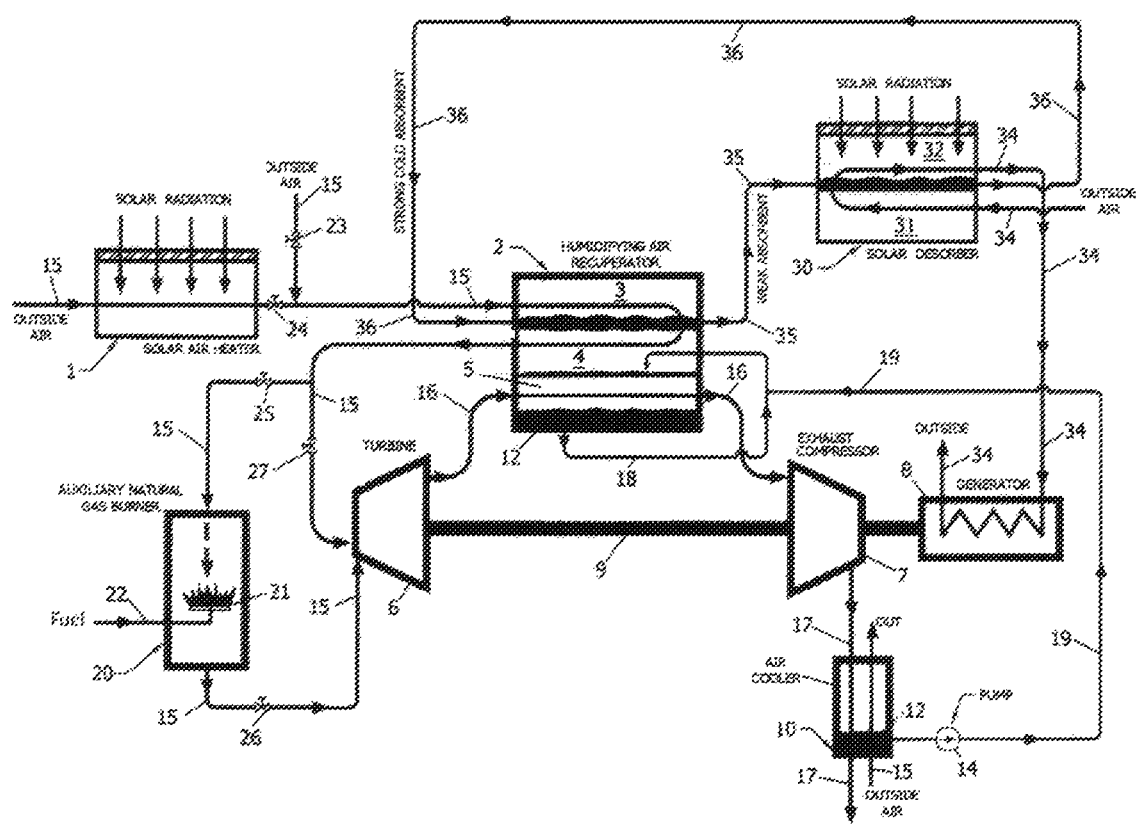
FIG. 5 is a schematic depiction of the proposed advanced solar thermally driven power system with the air dehumidifying process through liquid desiccant, which contains a solar desorber 30.

FIG. 5 is a schematic depiction of an embodiment of the proposed advanced solar thermally driven power system with the air dehumidifying process through liquid desiccant, which system comprises a solar desorber 30.

In turn, the solar desorber 30 comprises an enclosed interior space, a glazing surface oriented at the sun, and dry channels 31 and wet channels 32, which have a heat transfer relationship therebetween. There is arranged a clear wall in the desorber 30 for access of solar radiation as a heat source. The solar desorber 30 (FIG. 5) captures heat from the sun through the clear wall and transfer this heat to the wet channel 32, through which a weak liquid absorbent (desiccant) 35 is passed.

The solar radiation comes through the clear wall of the solar desorber 30 and increases the temperature of the weak liquid desiccant 35. It helps to evaporate water from this desiccant 35, which desiccant becomes a strong solution, denoted on FIG. 5 as a strong desiccant 36.

Also, solar radiation increases the temperature and humidity of an outside airflow 34 supplied into the desorber 30, which airflow 34 is then passed at first through the dry channels 31 (where it is cooled and approaching the dew point temperature), and thereafter through the wet channels 32 of the solar desorber 30.

Thereby, the precooled outside airflow 34 (after its passing through the dry channels 31) can absorb more vapor of water from the weak liquid desiccant 35, during its passing through the wet channels 32 of the solar desorber 30. Simultaneously the weak liquid desiccant 35, passing through the wet channels 32, is reduced in its temperature by evaporative cooling and it becomes the strong desiccant 36. This cold strong desiccant 36, after its passing through the wet channels 32, is directed to the dry working channels 3 of the humidifying air recuperator 2.

The outside airflow 15 is passed through the solar air heater 1, wherein outside airflow 15 increases its temperature, and thereafter it is directed at first to the dry working channels 3, and next to the wet working channels 4. Passing through the dry working channels 3, the outside airflow 15 has a direct contact with the cold and strong desiccant 36, which is directed from the solar desorber 30 to the humidifying air recuperator 2.

This has the direct effect of lowering the humidity of the outside airflow 15 allowing for lower temperatures and added cooling capacity. The strong desiccant 36 on the surface in the dry working channels 3 absorbs water vapor from the outside airflow 15 and transmits heat of absorption through the wall to the water layer of the wet working channels 4 providing for evaporating the water layer into the outside airflow 15. The continual cooling of the desiccant 36 in the channels 3 increases drying capabilities of the outside airflow 15.

After the strong desiccant 36 contacts with the outside airflow 15, the strong desiccant 36 removes the moisture from this air and it becomes drier, and simultaneously the strong desiccant 36 increases its humidity and it becomes a weak solution represented by the weak desiccant 35.

Following the weak liquid desiccant 35, after its passing through the dry working channels 3, it is directed to the wet channels 32 of the solar desorber 30. Therein, the moisture adsorbed in the desiccant 36 is then removed (regenerated) through the application of an additional thermal energy being the solar energy.

After the passing along the wet channels 32 of the solar desorber 30, where moisture is vaporized from the liquid desiccant 35 to the outside airflow 34, the weak liquid desiccant 35 is brought back as the strong desiccant 36 into the dry working channel 3. Sometimes, the outside airflow 34, after its passing through the wet channels 32, is directed from the solar desorber 30 to the generator 8 for cooling thereof. It is rational because this outside airflow 34 has a remaining cooling ability. It is rational to use this system (see FIG. 5) in higher humidity climates.

Figure 6:
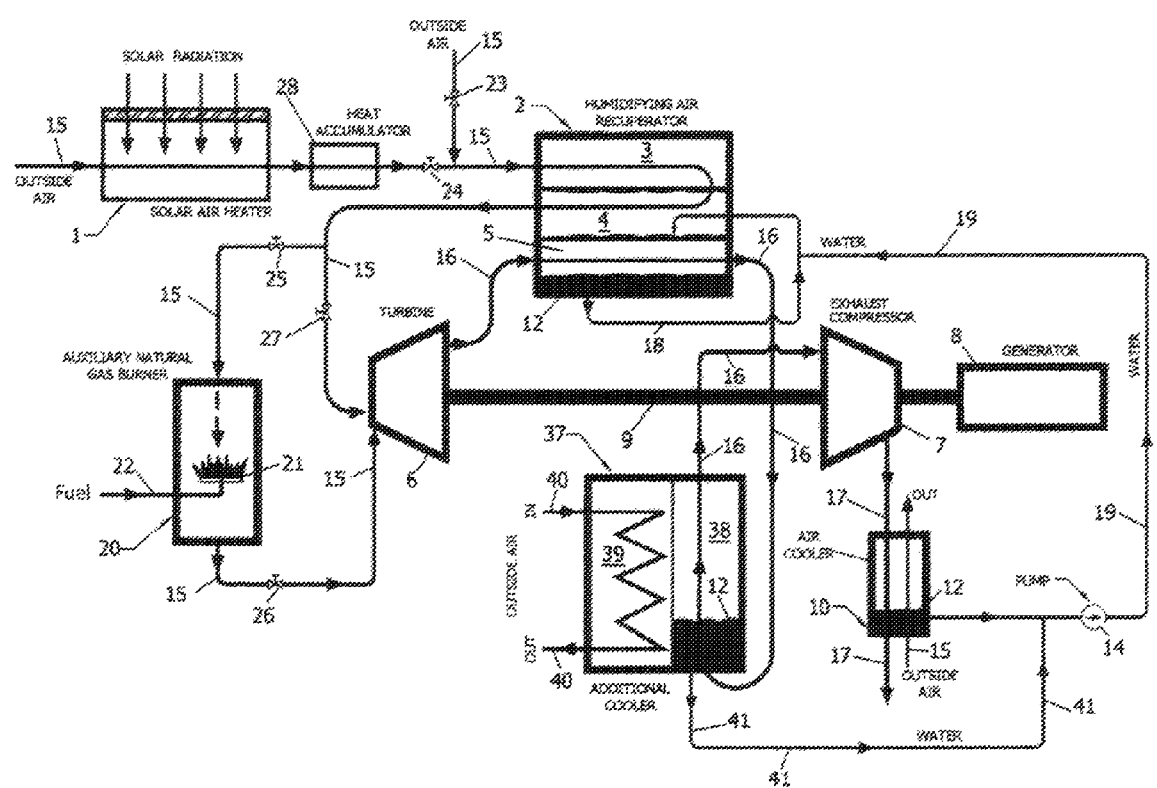
FIG. 6 is a schematic depiction of the proposed advanced solar thermally driven power system, which contains an additional cooler 37.

FIG. 6 is a schematic depiction of an embodiment of the proposed advanced solar thermally driven power system, which further comprises an additional cooler 37.

When a temperature of an outside airflow 40 is low (less than 60 degree C.), it is rational to use this attractive airflow 40 for an additional cooling process for the product stream 16, after its passing through the product channels 5 of the humidifying air recuperator 2. For this purpose, any kind of indirect air heat exchanger can be used, e.g. an additional cooler 37, which comprises a condensing channel 38 for the product stream 16 and a cooling channel 39 for the outside airflow 40. It provides opportunity to reduce the temperature of the product stream 16 that allows for condensing the additional amount of water vapor from the product stream 16, reducing its absolute humidity. The so obtained condensed water 12 from the condensing channel 38 is directed by a pump 14 through a water pipeline 41 for wetting the wet working channel 4.

As shown in FIG. 6, the pump 14 pumps the condensate water 12 from the condensing channel 38 essentially into the wet working channels 4. The water pipeline 41 connects the condensing channel 38 with the pump 14 for passing the condensate water 12 therethrough. A water pipeline 19 connects the pump 14 with the water line 18 for passing the condensate water 12 therethrough.

Therefore, additional water is not needed for operating the humidifying air recuperator 2, because it constantly extracts water 12 from the product stream 16. The water pipeline 41 can contain a condensate separator for cleaning some polluting condensate components and for the additional replenishing of water, if it is necessary. A reduction of the temperature and humidity of the product stream 16 brings about an increase of operating efficiency of the exhaust compressor 7, where the product stream 16 is directed from an additional cooler 37. Therefore this additional cooling process through the additional cooler 37 increases the efficiency of the proposed advanced solar thermally driven power system.

The most efficient cooling process today can be realized through the M-Cycle using the existing air conditioners from Coolerado Corporation™ (USA, Denver www.coolerado.com).

Figure 7:
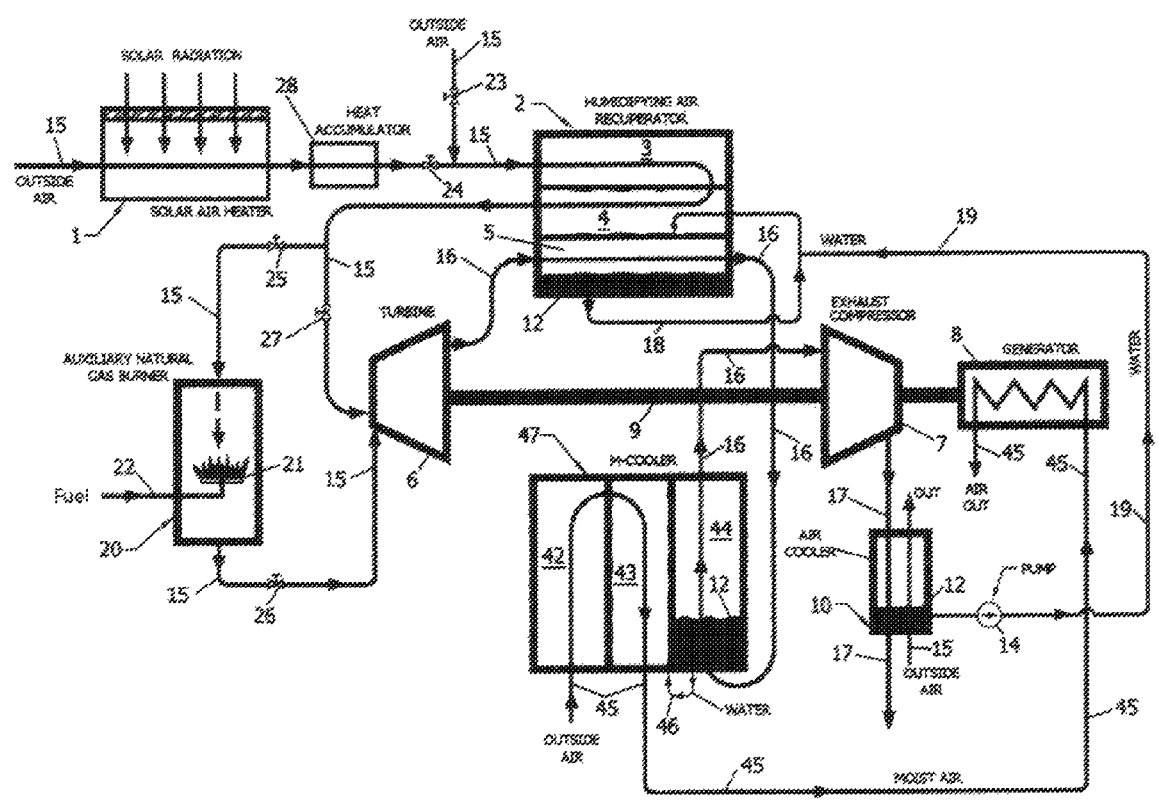
FIG. 7 is a schematic depiction of the proposed advanced solar thermally driven power system, which contains an M-Cooler 47.

FIG. 7 is a schematic depiction of an embodiment of the proposed advanced solar thermally driven power system with an M-Cooler 47, which is a product by Coolerado Corporation™.

Using an M-Cooler 47 instead of the additional cooler 37 (where temperature can approach only the dry bulb temperature of outside air, see FIG. 6), it provides an opportunity to significantly reduce the temperature of the product stream 16, approaching the dew point temperature of an outside airflow 45, which is much lower. The lower temperature allows for condensing a greater additional amount of water vapor from the product stream 16 (during its passing along a product channel 44) and greater reducing its absolute humidity.

The M-Cooler 47 comprises cooperating dry working channels 42 and wet working channels 43, and a product channel 44 (see FIG. 7).

The dry working channels 42 and the wet working channels 43 are directly connected to each other, and have a heat transfer relation therebetween via a common heat-conducting wall.

An outside airflow 45 is directed at first to the dry working channels 42, and next to the wet working channels 43 of the M-Cooler 47. Simultaneously the product stream 16, after its passing through the product channel 5 of the humidifying air recuperator 2, is directed to the product channel 44 of the M-Cooler 47. Therein this product stream 16 is cooled at a low pressure below the wet bulb temperature and it approaches the dew point temperature of outside air with reducing its absolute humidity. This lower temperature helps condensing more vapor of water 12 from the product stream 16 than when the additional cooler 37 (see FIG. 6) is used. This condensed water 12 from the product channel 44 is used through a water line 46 for wetting the wet working channel 43 of the M-Cooler 47. Therefore, additional water is not needed for operating the M-Cooler 47, because it constantly extracts water 12 from the product stream 16, after its passing along the product channel 44.

When moisture contained in the product stream 16 is condensed, the quantity of the product stream 16 decreases.

A reduction of the temperature and humidity and also quantity of the product stream 16 brings about increasing the operational efficiency of the exhaust compressor 7, where the product stream 16 is directed from the product channel 44 of the M-Cooler 47. Therefore, this extra cooling process through the M-Cooler 47 further increases the efficiency of the proposed advanced solar thermally driven power system.

After passing at first to the dry working channels 42, and next to the wet working channels 43 of the M-Cooler 47, the airflow 45, moisturized and warmed by the product stream 16, is controllably drawn from the M-Cooler 47 to the generator 8 for cooling thereof. It is rational because this outside airflow 45 has a remaining cooling ability and its heat transfer coefficient being greater than the corresponding parameters of the external air because its humidity is higher and therefore its specific heat is also higher.

Figure 8:
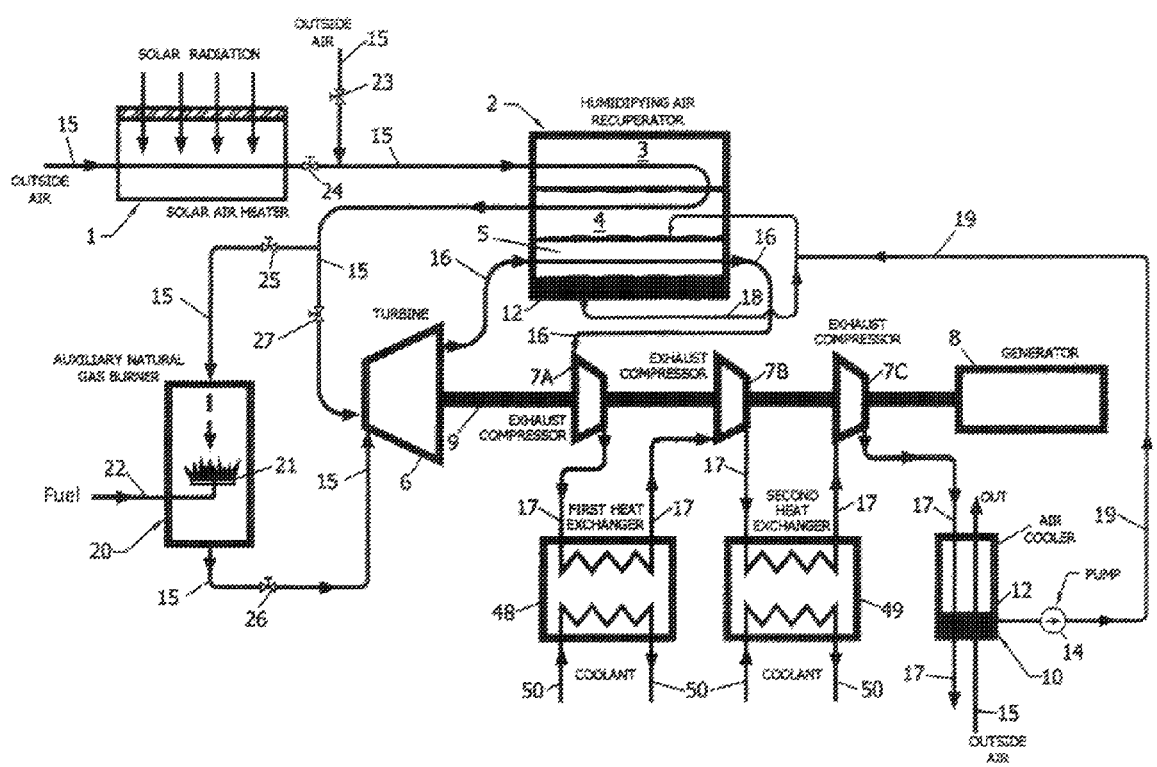
FIG. 8 is a schematic depiction of the proposed advanced solar thermally driven power system, which contains a multistage exhaust compressor system with a compressor 7a, compressor 7b and compressor 7c, between which there are installed a first heat exchanger 48 and second heat exchanger 49.

FIG. 8 illustrates another embodiment of the proposed advanced solar thermally driven power system, which comprises a multistage exhaust compressor assembly with a first stage compressor 7A, a second stage compressor 7B, and a third stage compressor 7C axially mounted on the shaft 9. Between these compressors there are installed a first heat exchanger 48 and a second heat exchanger 49, which are cooled by a coolant 50 (water or air). This multistage exhaust compressor assembly (with compressors 7A, 7B and 7C) can be used instead of using one exhaust compressor 7 (see FIGS. 1-7) for reducing essential irreversible energy losses. These losses are connected with the low temperatures and low pressures processes during operation of the exhaust compressor 7.

It is rational to use the diagram i (enthalpy)-S (entropy), which can help to explain this process with more details.

Figure 9:
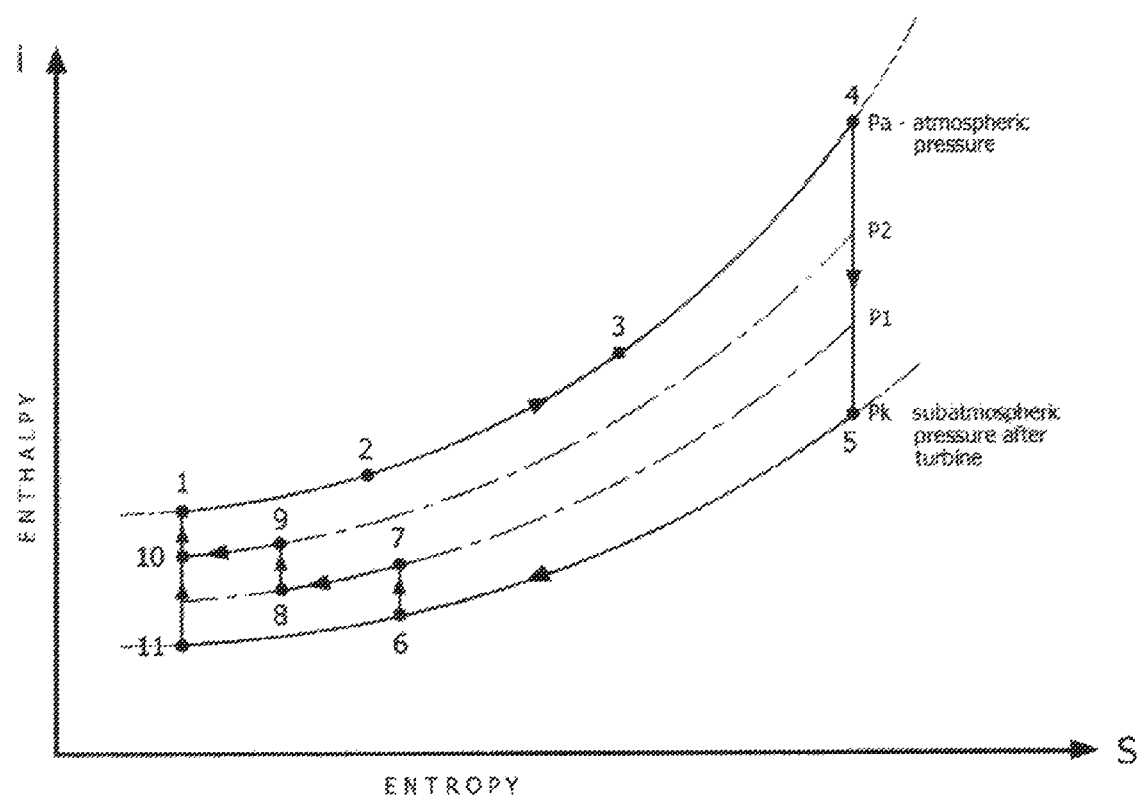
FIG. 9 depicts thermodynamic processes of the proposed solar thermally driven power system shown on an i (enthalpy)-S (entropy) diagram.

FIG. 9 illustrates thermodynamic processes of the proposed advanced solar thermally driven power system on the i (enthalpy)-S (entropy) diagram. There is shown a process 1-2-3-4-5-6-11-1 for the proposed advanced solar thermally driven power system, which was described above (see FIGS. 1-7): where, Pa is the atmospheric pressure, Pk is the subatmospheric pressure after the turbine, P2 and P3 are the following intermediate pressures:

1-2—heating process by the solar air heater 1 (Pa=const);
2-3—heating and humidifying processes along the cooperating dry 3 and wet 4 working channels
by the humidifying air recuperator 2 (Pa=const);
3-4—heating process by the auxiliary natural gas combustion chamber 20 (or can be used
another solar air heater) (Pa=const);
4-5—process of the expansion in a turbine 6 from Pa to Pk;
5-6—cooling and dehumidifying processes along the product channel 5 by the humidifying air
recuperator 2 (Pk=const);
6-11—cooling and dehumidifying processes (Pk=const) by the additional cooler 37 (see FIG. 6) or M-Cooler (see FIG. 7);
11-1—process of pressing from subatmospheric Pk to atmospheric Pa pressure by the exhaust compressor 7.

Also the same diagram i (enthalpy)-S (entropy) shows the process 1-2-3-4-5-6-7-8-9-10-1 for the proposed advanced solar thermally driven power system, which will be described below (see FIG. 8), where:

1-2—heating process by the solar air heater 1 (Pa=const);
2-3—heating and humidifying processes along the cooperating dry 3 and wet 4 working channels by the humidifying air recuperator 2 (Pa=const);
3-4—heating process by the auxiliary natural gas combustion chamber 20 (or can be used another solar air heater) (Pa=const);
4-5—process of the expansion in a turbine 6 from Pa to Pk;
5-6—cooling and dehumidifying processes along the product channel 5 by the humidifying air recuperator 2 (Pk=const);
6-7—process of pressing by the first stage compressor 7a from Pk to P1;
7-8—cooling process by the first heat exchanger 48 (P1=const);
8-9—process of pressing by the second stage compressor 7b from P1 to P2;
9-10—cooling process by the second heat exchanger 49 (P2=const);
10-1—process of pressing by the third stage compressor 7c from P2 to Pa.

According to FIG. 8, the product stream 16, after its passing through the product channel 5, is directed to the first compressor 7a, where it increases the temperature and pressure (see FIG. 9, process 6-7). Thereafter, the product stream 16 is directed to the first heat exchanger 48 for cooling by the coolant 50 (process 7-8). Later on, the product stream 16 is drawn to the second compressor 7b, wherein it again increases the temperature and pressure (process 8-9), and next, the product stream 16 is directed to the second heat exchanger 49 for cooling by the coolant 50 (process 9-10). Finally the product stream 16 is moved to the third compressor 7c (process 10-1), where its pressure and temperature (with using the air cooler 10) corresponds to the atmospheric air conditions (point 1). Overall, the number of compressors and heat exchangers can be different in terms of the operation conditions. After the last stage compressor, it is efficient to use the air cooler 10, where the product stream 16 is directed for reducing its temperature and the residual water condensation. Thereafter, the product stream 16 is discharged to the atmosphere with parameters being essentially close to the parameters of outside air.

Comparing the process 1-2-3-4-5-6-11-1 for the proposed advanced solar thermally driven power system, which was described above (FIGS. 1-7) and the process 1-2-3-4-5-6-7-8-9-10-1, which comprises the multistage exhaust compressor assembly (FIG. 8), it is possible to avoid using the low temperature process 6-11 (FIG. 9). Therefore it provides an opportunity to keep away with an expensive cryogenic heat exchanger. Also it allows for avoiding the expensive low temperature cryogenic process 11-1 (process of pressing from subatmospheric Pk to atmospheric pressure Pa by the exhaust compressor 7), which would require a presence of the complicated and costly cryogenic compressor. As a substitute, sometimes it is rational to employ an inexpensive and simple multistage exhaust compressor assembly, such as the one described above with the compressors 7a, 7b and 7c with the first and second heat exchangers 48 and 49.

After passing at first to the dry working channels 42 and next to the wet 43 working channels of the M-Cooler 47, the moisturized and hot airflow 45 is drawn from the M-Cooler 47 to the generator 8 for cooling thereof. It is rational because this outside airflow 45 has a remaining cooling ability and its heat transfer coefficient are greater than the corresponding parameters of external air because its humidity is higher and therefore its specific heat is also higher.

All embodiments of the proposed solar thermally driven power system (shown in FIGS. 1-9) comprise the air cooler 10 which offers a significant improvement in thermal efficiency of this system by extracting the residual recovering heat and moisture from the product stream 17. Sometimes the outside airflow 15, after its passing through the air cooler 10, is directed from the air cooler 10 to the generator 8 for cooling thereof. It is rational because this outside airflow 15 has a remaining cooling ability.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A thermally driven solar power generating system comprising: a solar air heater (1) supplied with an airflow (15); a gas turbine (6) for generating power; at least one exhaust compressor (7) mechanically coupled to and driven by the gas turbine (6); a humidifying air recuperator (2) essentially communicating with said solar air heater (1), said humidifying air recuperator (2) includes: product channels (5) disposed between an outlet of the gas turbine (6) and an inlet of the exhaust compressor (7), said product channels (5) are capable of collecting condensate water (12); dry working channels (3); wet working channels (4) directly connected with the dry working channels (3); wherein said product channels (5) and said wet working channels (4), and said dry working channels (3) and said wet working channels (4) have pair-wise heat transfer relations therebetween via respective common walls thereof; and a water line (18); wherein the following is arranged: said airflow (15) is drawn into the dry working channels (3), and next into the wet working channels (4), and, upon exiting said wet working channels (4), at least a portion of said airflow (15) is further drawn into and expanded through the gas turbine (6) converting into a product stream (16), further drawn into the product channels (5), wherein, at a predetermined pressure, the product stream (16) is cooled, predeterminedly approaching a dew point temperature of outside air, providing for condensing vapor into the condensate water (12) from the product stream (16), thereby reducing a quantity of said product stream (16); whereas the condensate water (12) is drawn from the product channels (5) via the water line (18) into the wet working channels (4); thereafter, said product stream (16) is sucked by the exhaust compressor (7), compressed therein, and is converted into a product air stream (17); and said product air stream (17) is then discharged from the exhaust compressor (7);

wherein said wet working channels (4) form a water layer therein; and said thermally driven solar power generating system further comprises: an electric generator (8), driven by said turbine (7); a solar desorber (30) supplied with solar radiation, said solar desorber (30) including: dry channels (31) and wet channels (32), having a heat transfer relationship therebetween via a common heat-conducting wall; wherein the following is arranged: an outside airflow (34) is supplied into the desorber (30), passed through the dry channels (31) being cooled and approaching a dew point temperature therein, and thereafter passed through the wet channels (32); a weak desiccant (35) is passed through said wet channels (32), thereby reducing a temperature of said weak desiccant (35), evaporating water therefrom, and converting said weak desiccant (35) into a strong desiccant (36); the strong desiccant (36) is passed through the wet channel (32), and is then introduced into the dry working channels (3); said airflow (15), being drawn into the dry working channels (3), directly contacts with the strong desiccant (36); in the dry working channels (3), the strong desiccant (36) absorbs water vapor from the airflow (15) thereby converting into said weak desiccant (35), and transmits heat of absorption through said common heat-conducting wall to said water layer of the wet working channels (4); the weak desiccant (35) is thereafter drawn into the wet channel (32), wherein moisture is vaporized therefrom into the outside airflow (34), thereby converting the weak desiccant (35) into the strong desiccant (36), and returning said strong desiccant (36) into the dry working channels (3); and, after passing through the wet channels (32), said outside airflow (34) is controllably drawn from the solar desorber (30) to the generator (8) for cooling thereof.

2. A thermally driven solar power generating system comprising: a solar air heater (1) supplied with an airflow (15); a gas turbine (6) for generating power; at least one exhaust compressor (7) mechanically coupled to and driven by the gas turbine (6); a humidifying air recuperator (2) essentially communicating with said solar air heater (1), said humidifying air recuperator (2) includes: product channels (5) disposed between an outlet of the gas turbine (6) and an inlet of the exhaust compressor (7), said product channels (5) are capable of collecting condensate water (12); dry working channels (3); wet working channels (4) directly connected with the dry working channels (3); wherein said product channels (5) and said wet working channels (4), and said dry working channels (3) and said wet working channels (4) have pair-wise heat transfer relations therebetween via respective common walls thereof; and a water line (18); wherein the following is arranged: said airflow (15) is drawn into the dry working channels (3), and next into the wet working channels (4), and, upon exiting said wet working channels (4), at least a portion of said airflow (15) is further drawn into and expanded through the gas turbine (6) converting into a product stream (16), further drawn into the product channels (5), wherein, at a predetermined pressure, the product stream (16) is cooled, predeterminedly approaching a dew point temperature of outside air, providing for condensing vapor into the condensate water (12) from the product stream (16), thereby reducing a quantity of said product stream (16); whereas the condensate water (12) is drawn from the product channels (5) via the water line (18) into the wet working channels (4); thereafter, said product stream (16) is sucked by the exhaust compressor (7), compressed therein, and is converted into a product air stream (17); and said product air stream (17) is then discharged from the exhaust compressor (7); and wherein:

the thermally driven solar power generating system, further comprises: an additional cooler (37) for an additional cooling of said product stream (16) thereby increasing the efficiency of said thermally driven solar power generating system; said additional cooler (37) is supplied with an outside airflow (40) and with the product stream (16) received from the product channels (5); said additional cooler (37) includes: a condensing channel (38) passing the product stream (16) therethrough before further passing thereof into said exhaust compressor (7); said additional cooler (37) is capable of collecting the condensate water (12); and a cooling channel (39) passing the outside airflow (40) therethrough thereby cooling said condensing channel (38); a water pump (14) pumping the condensate water (12) from said condensing channel (38) essentially into the wet working channels (4); a water pipeline (41) connecting said condensing channel (38) with said water pump (14) for passing the condensate water (12) therethrough; and a water pipeline (19) connecting said water pump (14) with the water line (18) for passing the condensate water (12) therethrough.

3. A thermally driven solar power generating system comprising: a solar air heater (1) supplied with an airflow (15); a gas turbine (6) for generating power; at least one exhaust compressor (7) mechanically coupled to and driven by the gas turbine (6); a humidifying air recuperator (2) essentially communicating with said solar air heater (1), said humidifying air recuperator (2) includes: product channels (5) disposed between an outlet of the gas turbine (6) and an inlet of the exhaust compressor (7), said product channels (5) are capable of collecting condensate water (12); dry working channels (3); wet working channels (4) directly connected with the dry working channels (3); wherein said product channels (5) and said wet working channels (4), and said dry working channels (3) and said wet working channels (4) have pair-wise heat transfer relations therebetween via respective common walls thereof; and a water line (18); wherein the following is arranged: said airflow (15) is drawn into the dry working channels (3), and next into the wet working channels (4), and, upon exiting said wet working channels (4), at least a portion of said airflow (15) is further drawn into and expanded through the gas turbine (6) converting into a product stream (16), further drawn into the product channels (5), wherein, at a predetermined pressure, the product stream (16) is cooled, predeterminedly approaching a dew point temperature of outside air, providing for condensing vapor into the condensate water (12) from the product stream (16), thereby reducing a quantity of said product stream (16); whereas the condensate water (12) is drawn from the product channels (5) via the water line (18) into the wet working channels (4); thereafter, said product stream (16) is sucked by the exhaust compressor (7), compressed therein, and is converted into a product air stream (17); and said product air stream (17) is then discharged from the exhaust compressor (7);

the thermally driven solar power generating system further comprises: an air cooler (10) supplied with outside air introduced therein; —a water pump (14), connected to the air cooler (10); and—a water pipeline (19) connecting the water pump (14) with said water line (18); wherein: said air cooler (10) receives the product air stream (17) from the exhaust compressor (7), said product air stream (17) is cooled within said air cooler (10) by the outside air, thereby reducing an absolute humidity of the product air stream (17) and a volume of the condensate water (12) produced in said air cooler (10); and, thereafter, the condensate water (12) is pumped by said water pump (14) via said water pipeline (19) substantially into the wet channels (4); and wherein:

the thermally driven solar power generating system additionally further comprises: an additional cooler (37) for additional cooling of said product stream (16) thereby increasing the efficiency of said thermally driven solar power generating system; said additional cooler (37) is supplied with an outside airflow (40) and with the product stream (16) received from the product channels (5); said additional cooler (37) is capable of collecting the condensate water (12); said additional cooler (37) includes: a condensing channel (38) passing the product stream (16) therethrough, and passing the condensate water (12) to said water pump (14) further pumping thereof from said condensing channel (38) essentially into the wet working channels (4); and a cooling channel (39) passing the outside airflow (40) therethrough thereby cooling said condensing channel (38); a water pipeline (41) connecting said condensing channel (38) with said water pump (14) and with said water pipeline (19).

4. A thermally driven solar power generating system comprising: a solar air heater (1) supplied with an airflow (15); a gas turbine (6) for generating power; at least one exhaust compressor (7) mechanically coupled to and driven by the gas turbine (6); a humidifying air recuperator (2) essentially communicating with said solar air heater (1), said humidifying air recuperator (2) includes: product channels (5) disposed between an outlet of the gas turbine (6) and an inlet of the exhaust compressor (7), said product channels (5) are capable of collecting condensate water (12); dry working channels (3); wet working channels (4) directly connected with the dry working channels (3); wherein said product channels (5) and said wet working channels (4), and said dry working channels (3) and said wet working channels (4) have pair-wise heat transfer relations therebetween via respective common walls thereof; and a water line (18); wherein the following is arranged: said airflow (15) is drawn into the dry working channels (3), and next into the wet working channels (4), and, upon exiting said wet working channels (4), at least a portion of said airflow (15) is further drawn into and expanded through the gas turbine (6) converting into a product stream (16), further drawn into the product channels (5), wherein, at a predetermined pressure, the product stream (16) is cooled, predeterminedly approaching a dew point temperature of outside air, providing for condensing vapor into the condensate water (12) from the product stream (16), thereby reducing a quantity of said product stream (16); whereas the condensate water (12) is drawn from the product channels (5) via the water line (18) into the wet working channels (4); thereafter, said product stream (16) is sucked by the exhaust compressor (7), compressed therein, and is converted into a product air stream (17); and said product air stream (17) is then discharged from the exhaust compressor (7); and wherein:

the thermally driven solar power generating system further comprises: an electric generator (8), driven by said turbine (7); an M-Cooler (47) for an additional cooling of said product stream (16); said M-Cooler (47) is supplied with an outside airflow (45), and with the product stream (16) received from the product channels (5) and further passed therethrough; said M-Cooler (47) includes: a dry working channel (42) and a wet working channel (43) directly connected to said dry working channel (42) and having a heat transfer relation therewith; wherein the outside airflow (45) is sequentially passed through said dry working channel (42), said wet working channel (43), and, being moisturized, is controllably passed to said electric generator (8) for cooling thereof; and a product channel (44) having a heat transfer relation with said wet working channel (43) and connected thereto via a water pipeline (46), said product channel (44) is capable of extracting the condensate water (12) from the product stream (16) and collecting thereof, wherein the condensate water (12) is passed through the water pipeline (46) for wetting the wet working channel (43); said product channel (44) cools and passes the product stream (16) therethrough to the exhaust compressor (7) thereby increasing the efficiency of said thermally driven solar power generating system.

* * * * *